(12) United States Patent
Ignatiev

(10) Patent No.: US 12,207,630 B1
(45) Date of Patent: Jan. 28, 2025

(54) FISH LANDING NET

(71) Applicant: Maxim Ignatiev, Longboat Key, FL (US)

(72) Inventor: Maxim Ignatiev, Longboat Key, FL (US)

(*) Notice: Subject to any disclaimer, the term of this patent is extended or adjusted under 35 U.S.C. 154(b) by 155 days.

(21) Appl. No.: 17/843,040

(22) Filed: Jun. 17, 2022

Related U.S. Application Data

(63) Continuation-in-part of application No. 17/168,753, filed on Feb. 5, 2021, now abandoned.

(60) Provisional application No. 62/970,229, filed on Feb. 5, 2020.

(51) Int. Cl.
*A01K 77/00* (2006.01)

(52) U.S. Cl.
CPC .................. *A01K 77/005* (2022.02)

(58) Field of Classification Search
CPC .............................. A01K 77/00; A01K 77/005
USPC ............................................ 43/5, 7, 8, 11, 12
See application file for complete search history.

(56) References Cited

U.S. PATENT DOCUMENTS

| | | | | |
|---|---|---|---|---|
| 10,794 A * | 4/1854 | Saxe | ............... | A01K 77/00 43/12 |
| 60,287 A * | 12/1866 | Upton | ............... | B63B 21/48 114/311 |
| 289,224 A * | 11/1883 | Clarke | ............... | B63B 21/48 114/311 |
| 396,229 A * | 1/1889 | Pagan | ............... | B63B 21/48 244/142 |
| 440,568 A * | 11/1890 | Hebard | ............... | A01K 77/00 43/12 |
| 733,118 A * | 7/1903 | Armstrong | ............... | A01K 83/04 43/37 |
| 843,946 A * | 2/1907 | Howald | ............... | A01K 93/00 43/43.1 |
| 1,180,120 A * | 4/1916 | Evans | ............... | A01K 83/04 43/37 |
| 1,334,702 A * | 3/1920 | Juras | ............... | A01K 83/04 43/37 |
| 1,420,396 A * | 6/1922 | Warren, Sr. | ............... | A01K 73/12 43/12 |
| 1,543,562 A * | 6/1925 | Ivan | ............... | B63B 21/48 114/311 |
| 1,797,251 A * | 3/1931 | Tyrrell | ............... | A01K 77/00 43/5 |
| 1,810,565 A * | 6/1931 | Kenely | ............... | A01K 91/06 43/44.96 |
| 2,153,339 A * | 4/1939 | Reeves | ............... | A01K 93/00 43/44.91 |

(Continued)

*Primary Examiner* — Darren W Ark
*Assistant Examiner* — Kevin M Dennis
(74) *Attorney, Agent, or Firm* — Mark D. Bowen, Esq.; Malin Haley DiMaggio & Bowen, P.A.

(57) ABSTRACT

A line guided fish landing net apparatus is affixed to a fishing line upon hooking a fish and placed in the water wherein nets are automatically deployed as the apparatus travels down the line. Once the net apparatus reaches the fish it wraps and entangles it thereby significantly diminishing its ability to thrash about making it much easier to land a large fish on a sport fishing vessel. An upper net section has a top peripheral edge thereof configured to be positively buoyant to spread to a deployed position, and a lower net section has a bottom peripheral edge configured to be negatively buoyant to spread to a deployed position.

3 Claims, 6 Drawing Sheets

(56) References Cited

U.S. PATENT DOCUMENTS

| | | | | |
|---|---|---|---|---|
| 2,233,670 A | * | 3/1941 | Lee | A01K 97/14 43/5 |
| 2,537,321 A | * | 1/1951 | Walton | A01K 91/06 43/43.1 |
| 2,598,140 A | * | 5/1952 | Shukites | A01K 93/02 43/43.1 |
| 2,615,272 A | * | 10/1952 | Wells | A01K 77/00 43/12 |
| 2,626,477 A | * | 1/1953 | Richardson | A01K 77/00 43/5 |
| 2,641,078 A | * | 6/1953 | Gearien | A01K 97/14 24/131 R |
| 2,768,467 A | * | 10/1956 | Radune | A01K 91/10 43/15 |
| 2,782,546 A | * | 2/1957 | Edworthy | A01K 77/00 43/11 |
| 2,897,625 A | * | 8/1959 | Spitzli | A01K 75/04 43/43.1 |
| 2,921,397 A | * | 1/1960 | Luthi | A01K 97/14 43/7 |
| 3,039,419 A | * | 6/1962 | Rimar | B63B 21/48 43/6 |
| 3,087,275 A | * | 4/1963 | Svoboda | A01K 93/00 43/44.87 |
| 3,224,131 A | * | 12/1965 | Parse | A01K 77/00 43/12 |
| 3,267,603 A | * | 8/1966 | Josephs | A01K 97/14 43/5 |
| 3,363,355 A | * | 1/1968 | Kellner | A01K 97/14 43/25 |
| 3,531,887 A | * | 10/1970 | Bortle | A01K 97/24 43/17.2 |
| 3,872,616 A | * | 3/1975 | Poland | A01K 83/00 43/4.5 |
| 3,896,579 A | * | 7/1975 | Benne | A01K 91/18 254/389 |
| 3,911,608 A | * | 10/1975 | Holling | A01K 97/14 43/25 |
| 3,922,810 A | * | 12/1975 | Kelly | A01K 97/24 43/17.2 |
| 3,973,236 A | * | 8/1976 | McLaughlin | G01V 1/3826 114/244 |
| 4,141,172 A | * | 2/1979 | Prosol | A01K 69/06 43/105 |
| 4,292,753 A | | 10/1981 | Yesuratnam | |
| 4,638,591 A | * | 1/1987 | Neumann | A01K 83/02 43/89 |
| 4,653,219 A | * | 3/1987 | Kaupert | A01K 91/06 43/43.1 |
| 4,674,221 A | * | 6/1987 | Weber | A01K 77/00 43/11 |
| 4,754,569 A | * | 7/1988 | Nielsen | A01K 97/14 43/6 |
| 4,870,773 A | * | 10/1989 | Schmucker | A01K 77/00 43/12 |
| 5,025,746 A | * | 6/1991 | Boulter | B63B 34/26 114/311 |
| 5,237,768 A | | 8/1993 | Kiekhafer et al. | |
| 5,339,556 A | * | 8/1994 | Boehm | A01K 77/00 43/11 |
| 5,339,557 A | * | 8/1994 | Brundage | A01K 77/00 43/11 |
| 5,361,528 A | * | 11/1994 | Peacock | A01K 80/00 43/6.5 |
| 5,380,113 A | * | 1/1995 | Boehm | A01K 77/00 16/319 |
| 5,419,074 A | * | 5/1995 | Thomas | A01K 77/00 43/11 |
| 5,605,003 A | * | 2/1997 | Krc | A01K 77/00 43/12 |
| 5,842,304 A | * | 12/1998 | Rivera | A01K 69/06 43/105 |
| 5,941,011 A | * | 8/1999 | Baker | F16C 11/04 16/366 |
| 6,112,699 A | * | 9/2000 | Saxby | A01K 79/00 119/213 |
| 6,446,378 B1 | * | 9/2002 | Welch | A01K 77/00 43/11 |
| 6,550,413 B2 | * | 4/2003 | Fiorentino | B63B 21/48 244/31 |
| 6,555,155 B2 | * | 4/2003 | Saxby | A01K 80/00 435/68.1 |
| 7,043,866 B2 | * | 5/2006 | Burkovskiy | A01K 69/06 43/100 |
| 7,065,918 B2 | * | 6/2006 | Leone | A01K 91/04 43/43.1 |
| 7,337,576 B2 | * | 3/2008 | Boltan | A01K 87/007 43/7 |
| 7,370,450 B2 | * | 5/2008 | Roos | A01K 83/06 43/35 |
| 7,596,901 B1 | * | 10/2009 | Johnson | A01K 91/06 43/42.22 |
| 8,943,734 B2 | * | 2/2015 | Sorvik | A01K 91/18 43/4.5 |
| 10,015,954 B2 | * | 7/2018 | Callingham | A01K 77/00 |
| 10,091,976 B2 | * | 10/2018 | Wilson | A01K 85/01 |
| 11,794,657 B2 | * | 10/2023 | Johansson | B60R 5/047 |
| 2002/0076468 A1 | * | 6/2002 | Saxby | C12N 9/00 426/56 |
| 2005/0005497 A1 | * | 1/2005 | Boltan | A01K 77/00 43/7 |
| 2006/0059763 A1 | * | 3/2006 | Passint | A01K 77/00 43/7 |
| 2007/0294934 A1 | * | 12/2007 | Myers | A01K 93/00 43/41 |
| 2009/0255166 A1 | * | 10/2009 | Lu | A01K 77/00 43/12 |
| 2010/0281752 A1 | * | 11/2010 | Daley, Jr. | A01K 77/00 43/4 |
| 2012/0260557 A1 | * | 10/2012 | Sorvik | A01K 91/18 43/4.5 |
| 2022/0024386 A1 | * | 1/2022 | Johansson | B60R 5/04 |

* cited by examiner

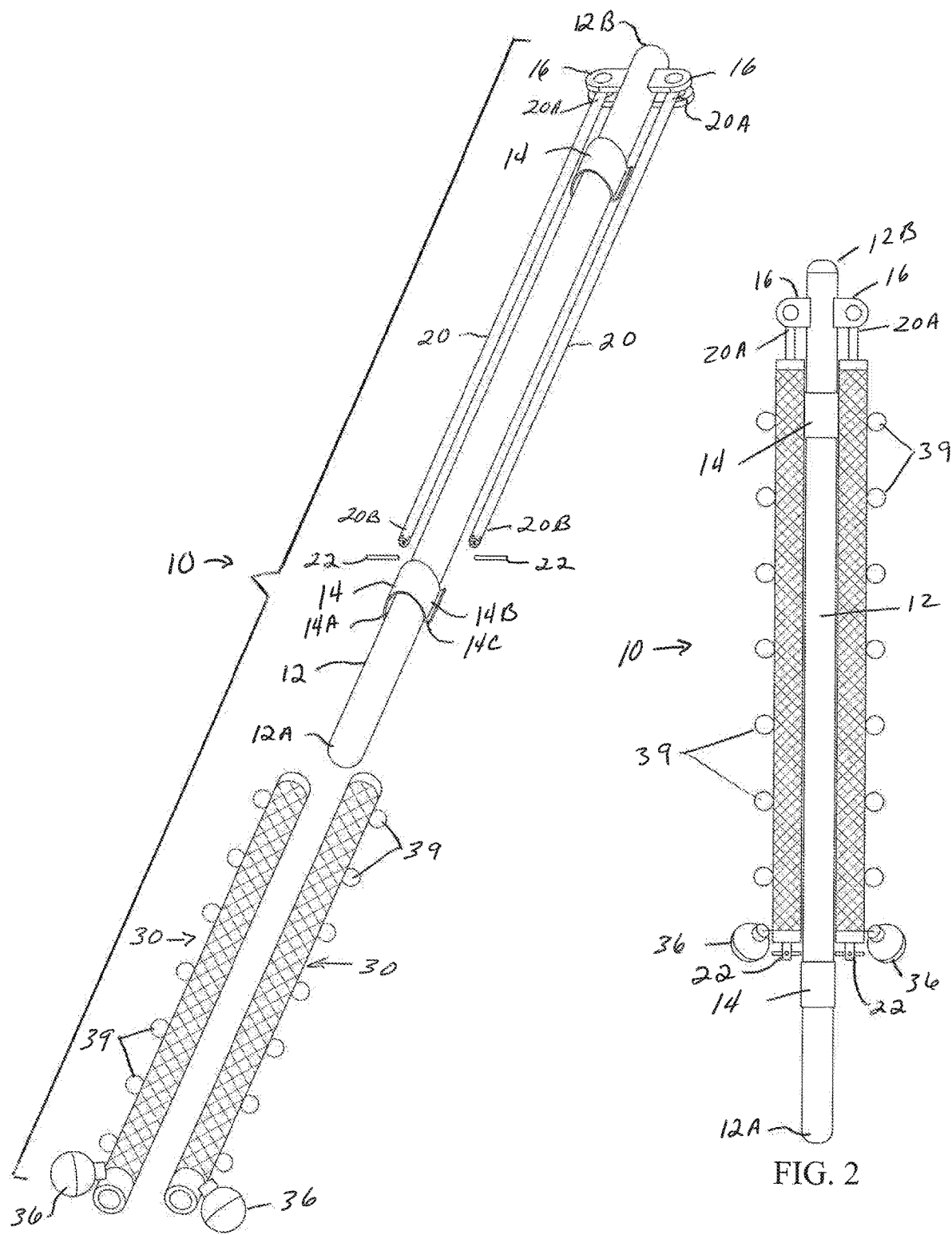

FISH LANDING NET

CROSS REFERENCE TO RELATED APPLICATIONS

This application is a continuation-in-part of U.S. patent application Ser. No. 17/168,753, filed on Feb. 5, 2021, which claims the benefit of provisional U.S. Patent Application Ser. No. 62/970,229, filed on Feb. 5, 2020.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to fishing apparatus, and more particularly to a fish landing net adapted for removable connection to fishing line to assist in landing large game fish onto a fishing vessel.

2. Description of Related Art

Fishing is an ancient practice dating back thousands of years, and is an activity currently enjoyed by millions worldwide. Recreational and sport fishermen fish for pleasure and competition. The most common form of recreational and sport fishing is done with a rod, reel, line, hooks, and a wide range of bait. Big-game fishing involves catching large open-water species such as tuna, dolphin, sailfish, and marlin, from various fishing vessels. Landing these large and powerful fish onto the vessel is particularly difficult as they struggle to get free. Accordingly, fishermen are often required to use a gaff hook or landing net to pull the fish from the water. The use of gaff hooks can severely injure the fish and are generally not suited if the fisherman desires to practice "Catch and Release." Further, landing nets are often too small for use with larger game fish. Accordingly, there exists a need for advancements in the art of fishing apparatus suitable for use in facilitating the ease of landing of large fish while preventing harm to the animal.

The background art reveals a number of attempts that attempt to address the difficulties faced by fishermen when landing large fish caught with a rod and reel. U.S. Pat. No. 1,797,251, issued to Tyrrell, discloses a combination fishing tackle and net wherein the net slidably moves down the fishing line. U.S. Pat. No. 2,626,477, issued to Richardson, discloses a fish landing net adapted to be placed on the fishing line and slide along to ensnare a hooked fish. U.S. Pat. No. 2,641,078, issued to Gearien, discloses a rigid fish landing funnel which rides along the fishing line. In a similar manner, U.S. Pat. No. 3,363,355, issued to Kellner, discloses the combination of a fishing rod and fish trap that slides down the line. U.S. Pat. No. 10,015,954, issued to Callingham, discloses a device for retrieving a fish caught on a fishing line including a receptacle for passing along the line to receive the fish and a retriever for retrieving the receptacle.

The various apparatus of the prior art for use in assisting in the landing of fish have failed to gain widespread use and acceptance by fishermen due to a number of inherent shortcomings and disadvantages. Accordingly, there remains a need in the art for advancements directed to a line guided fish capture net suitable for use with large game fish hooked by a fisherman on a rod and reel.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56 (a) exists.

BRIEF SUMMARY OF THE INVENTION

The present invention overcomes the disadvantages and limitations present in the art by providing a fish landing net adapted to be secured to a fishing line upon which a game fish has been hooked, wherein the fish landing net functions by traveling down the fishing line and immobilizing the hooked game fish.

A line guided fish landing net apparatus in accordance with the present invention includes guide rod adapted with quick connect clips that enable the guide rod to be easily coupled to the fishing line after a fish is hooked. A pair of arms are connected to the guide rod and pivotally configurable between stowed, deployed, and capture configurations. Each arm receives a pre-rolled net tube removably disposed thereon and secured by a locking mechanism. Each net tube is adapted to deploy an upper and lower net sections. The upper net sections are adapted with flotation devices and the lower net sections are adapted with weights to enable deployment thereof. In one embodiment that net is fabricated from substantially transparent material such that it is not easily observed as it approaches the fish thereby preventing the fish from taking evasive maneuvers to avoid coming into contact therewith.

After hooking a fish, the landing net apparatus is connected to the fishing line beyond the tip of the rod using the quick-connect clips and deployed by placing the apparatus in the water. Upon deployment of the landing net apparatus the drag generated by water flowing past the apparatus causes the pair of opposing swing out arms having the net tubes disposed thereon to convert from the stowed configuration to the deployed configuration. In addition, the upper and lower nets are unfurled to form wing-like shapes with the top net assisted by buoyant floats, and a bottom net assisted by weights. Drag causes the guide rod and net assembly to travel down the fishing line until it reaches the end whereafter the assembly stops and increased drag forces cause the arms to move to the capture position where the top and bottom nets wrap around the fish thereby significantly diminishing its ability to thrash about so as to make it much easier to land the fish on a sport fishing vessel.

Accordingly, it is an object of the present invention to provide a fishing landing net assembly that assists in landing large fish on a fishing boat by significantly limiting the mobility of the fish.

Another object of the present invention is to provide a fish landing net that automatically deploys from a stowed configuration when placed in the water.

Yet another object of the present invention is to provide a fish landing net that automatically configures to an immobilizing configuration when reaching a hooked fish.

It is another object of the present invention to provide such a device that is quickly and easily affixed to the fishing line.

Still another object of the present invention is to provide a fish landing aid that uses a net formed of transparent material to minimize visibility while being deployed.

Yet another object of the present invention related to providing a fish immobilizing net that maintains a desired orientation when deployed prior to fish capture.

Still another object of the present invention is to provide a fish landing device that rides along fishing line to a hooked fish wherein the speed of deployment toward the fish is controlled by movement of the vessel.

In accordance with these and other objects, which will become apparent hereinafter, the instant invention will now be described with particular reference to the accompanying drawings.

BRIEF DESCRIPTION OF THE SEVERAL VIEWS OF THE DRAWINGS

FIG. 1 is an exploded perspective view of a fish landing net apparatus in accordance with the present invention;

FIG. 2 is a top plan view thereof in the stowed configuration;

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

In describing this invention, the word "connected" is used. By "connected" is meant that the article or structure referred to is joined, either directly, or indirectly, to another article or structure. By "indirectly joined" is meant that there may be an intervening article or structure imposed between the two articles which are "connected". "Directly joined" means that the two articles or structures are in contact with one another or are essentially continuous with one another. By adjacent to a structure is meant that the location is near the identified structure.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 3:
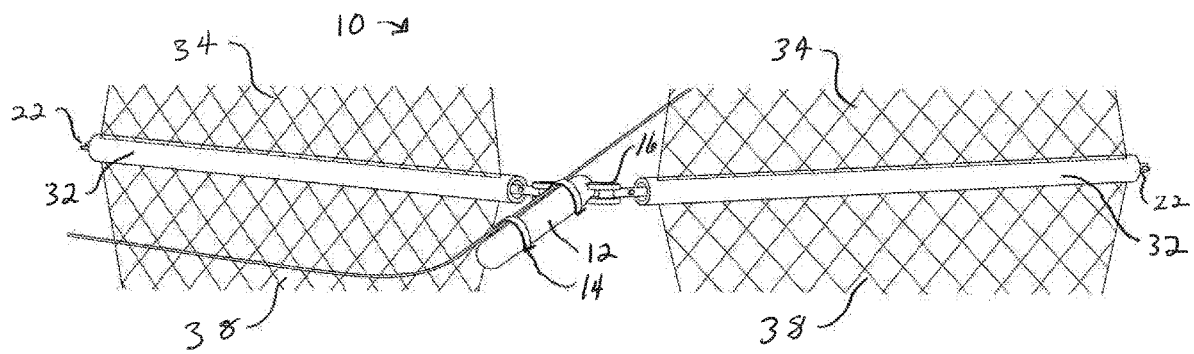
FIG. 3 is a partial front perspective view of the fish landing net apparatus attached to a fishing line.
Figure 4:
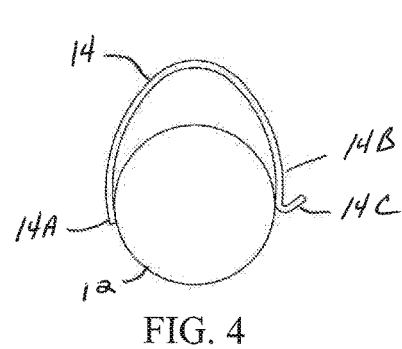
FIG. 4 is a partial end view detailing the fishing line attachment clip.

Turning now to the drawings, FIGS. 1-9 illustrate a line guided fish landing net apparatus, generally referenced as 10, in accordance with the present invention. Line guided fish landing net apparatus 10 functions as a fish immobilizing device to aid in landing a large game fish onto a fishing vessel. As best seen in FIGS. 1-3, line guided fish landing net apparatus 10 includes an elongated, rigid guide rod 12. Guide rod 12 is preferably a tubular structure formed from a corrosion resistant material such as aluminum, PVC, plastic, carbon fiber, stainless steel, or any other suitable material. In one embodiment, guide rod 12 has a length of approximately 3.0 feet and a diameter of ½ inch. Guide rod 12 has a proximal end 12A and a distal end 12B. A pair of fishing line quick connect clips, referenced as 14 are affixed to guide rod 12 between the proximal and distal ends, 12A and 12B. Each quick connect clip 14 defines a generally C-shaped clip body formed of a resilient material. As seen in FIG. 4, each clip 14 has a first end 14A directly joined to guide rod 12 and a second end 14B defining a flange 14C. Quick connect clips 14 enable fish landing net apparatus 10, and particularly guide rod 12 to be easily coupled to the fishing line after a fish is hooked by sliding the fishing line between the outer surface of guide rod 12 and the second end 14B of each clip 14.

Figure 5:
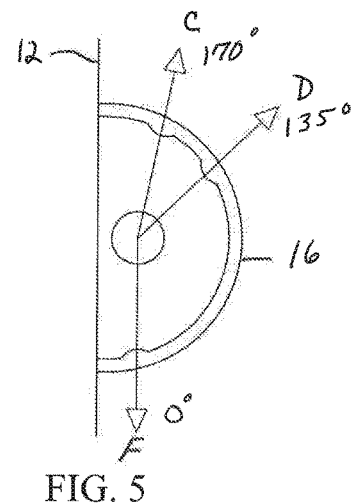
FIG. 5 is a schematic illustration of the angular positions for the net arms in the stowed, deployed, and capture configurations.

A pair of elongate arms 20 are pivotally connected to hinges 16 affixed to distal end 12b of guide rod 12. Each arm includes a proximal end 20A pivotally connected to guide rod 12 via hinge 16, and a distal end 20B having a T-Lock locking mechanism 22. Arms 20 are pivotally configurable between at least a first/stowed position, a second/deployed position, and a third/capture position. Additional structure, such as boss and detent, may be provided to provide stops at each of said first, second, and third positions. FIG. 5 provides a schematic illustration of a hinge 16 and illustrates the angular relations of an arm in each of the folded (referenced as "F"), deployed (referenced as "D"), and capture (referenced as "C") positions. In the folded position arms 20 are folded substantially adjacent guide rod 12 in parallel relation therewith as seen in FIGS. 1 and 2. In the deployed configuration, arms 20 are angularly disposed approximately 135-degrees relative to guide rod 12 in preparation of capturing the fish as the apparatus slides down the line. The arms move to the capture configuration when guide rod 12 makes contact with the fish thereby causing the arms to swing toward the fish allowing the nets to entangle the fish as more fully discussed herein below. In the capture configuration arms 20 are angularly disposed approximately 170-degrees to capture the fish. The positions discussed above are exemplary and variations thereof are possible without departing from the scope of the present invention.

Figure 6:
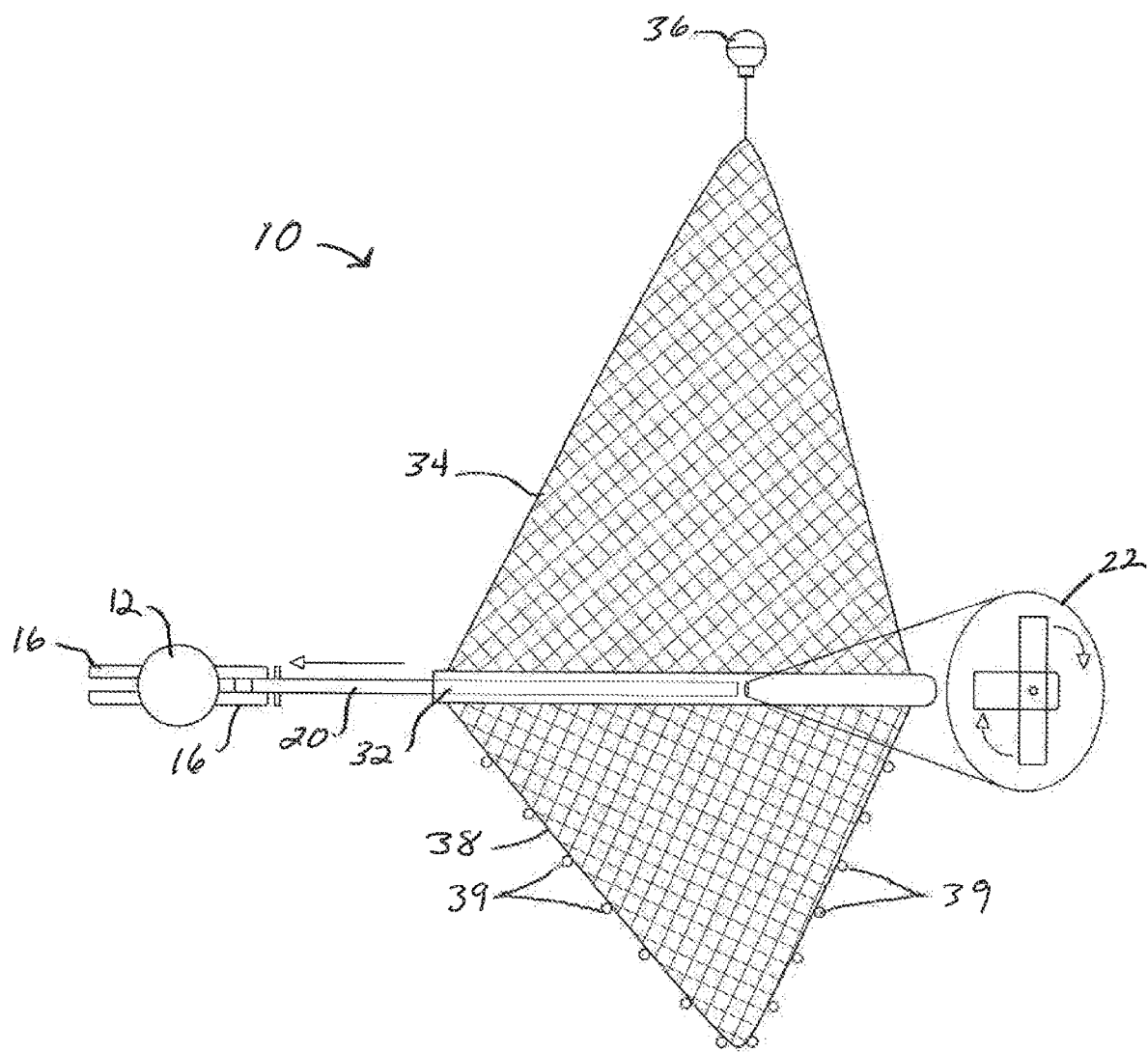
FIG. 6 is an end view illustrating installation of a net tube on one of the arms.
Figure 7:
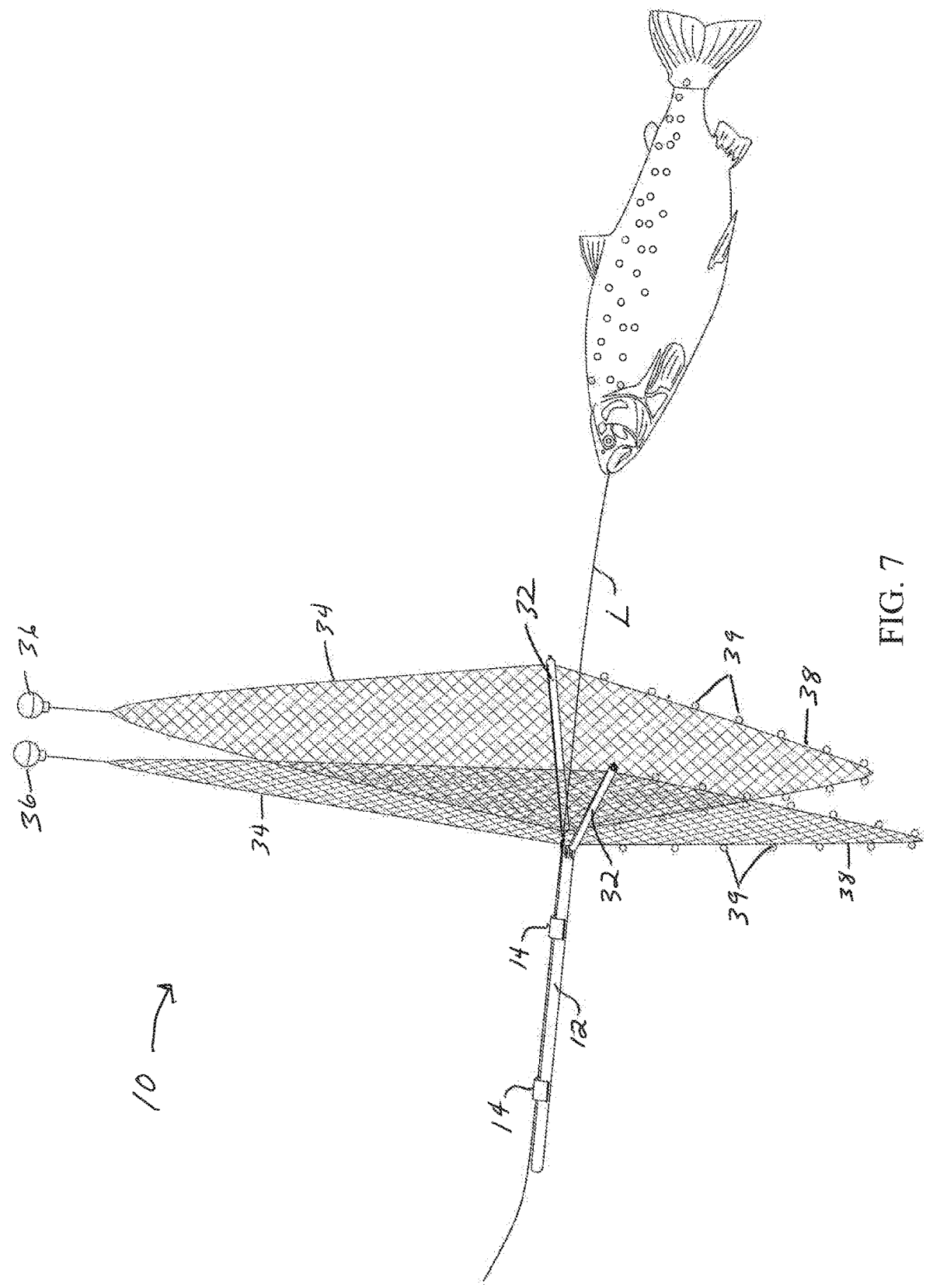
FIG. 7 is a perspective illustration of the fish landing net apparatus attached to a fishing line in a deployed configuration.

Each arm 20 receives a pre-rolled net tube, generally referenced as 30, rotatably disposed thereon and prevented from axial removal by a T-lock mechanism 22. Each net tube 30 includes a cylindrical main body 32, and upper and lower net sections, referenced as 34 and 38 respectively, connected thereto. Net sections 34 and 38 are configurable between a rolled configuration wherein the net sections wrapped around main body 32 as seen in FIGS. 1 and 2, and a deployed configuration wherein the net sections are unfurled as best illustrated in FIGS. 6 and 7. Upper and lower net sections 34 and 38 are initially disposed on the main body 32 of net tube 30 in a rolled configuration as seen in FIGS. 1 and 2.

Upper net section 34 has a lower edge connected to main body 32 and an upper edge having at least one floatation device 36 affixed thereto. Lower net section 38 has an upper edge connected to main body 32 and a plurality of weights 39 connected thereto. Flotation devices 36 and weights 39 function to enable deployment thereof. In one embodiment the net sections are fabricated from substantially transparent material such that it is not easily observed as it approaches the fish thereby preventing the fish from taking evasive maneuvers to avoid coming into contact therewith.

Figure 8:
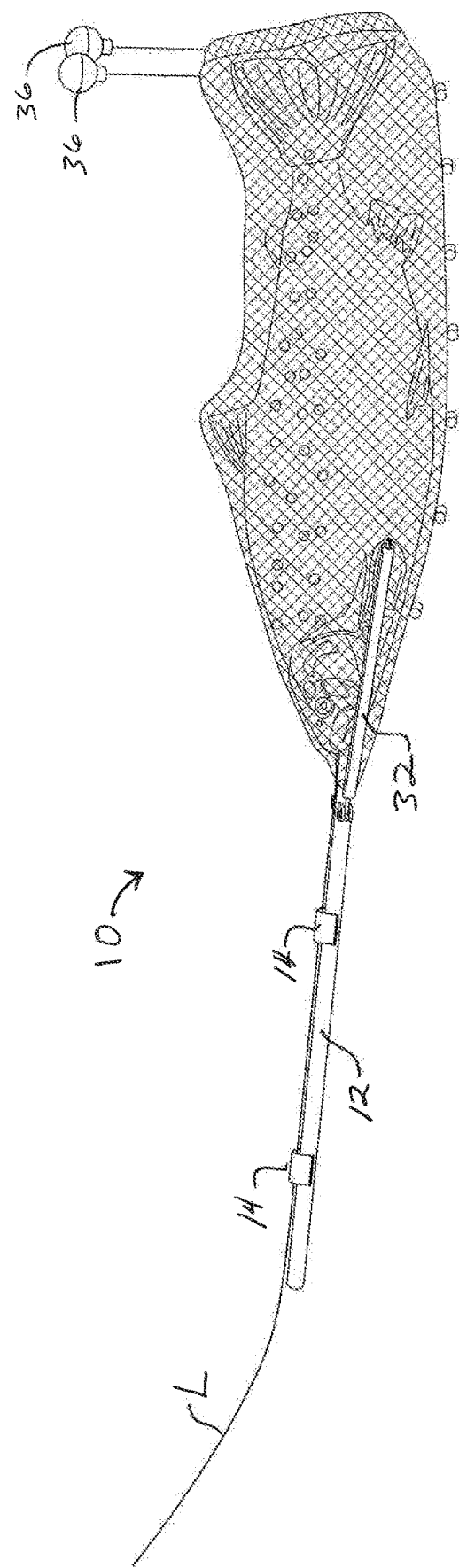
FIG. 8 is a side view illustration of the fish landing net apparatus attached to a fishing line in the capture configuration with a fish captured therein.
Figure 9:
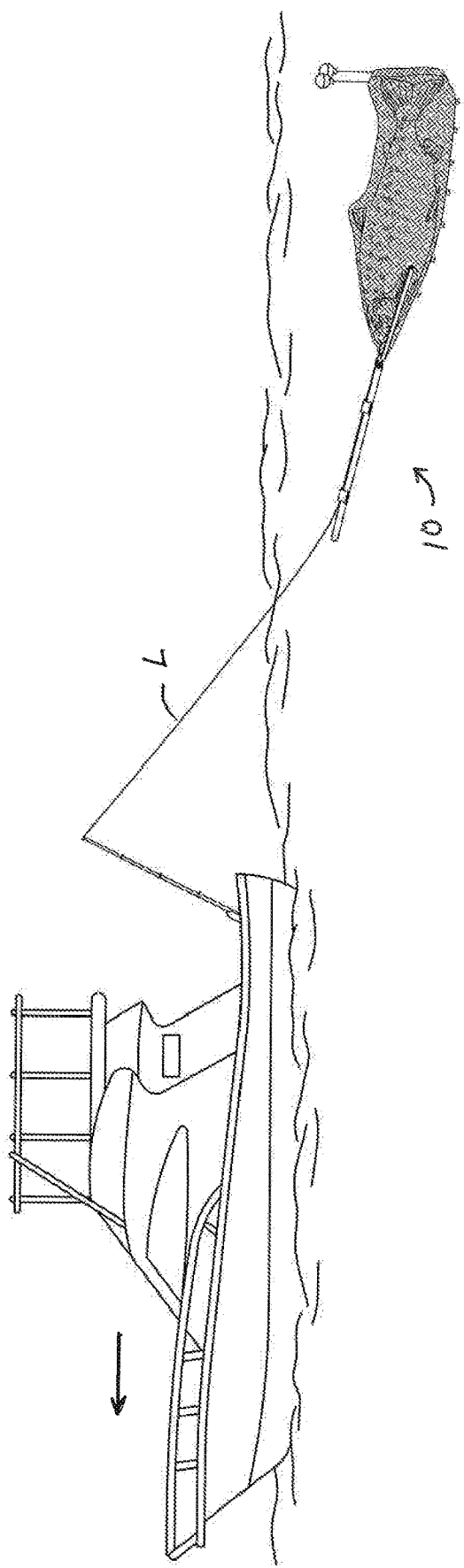
FIG. 9 is a side view of the fish landing net apparatus having captured a fish while attached to a fishing line from a fishing vessel.

FIGS. 7-9 illustrate use of fish landing net apparatus. Upon hooking a fish, landing net apparatus 10 is connected to the fishing line beyond the tip of the rod by sliding the fishing line, referenced as "L" between guide rod 12 and quick-connect clips 14 whereby the apparatus is slidably connected to fishing line "L". Fish landing net apparatus 10 is deployed by placing the apparatus in the water where drag generated by water flowing past the apparatus as the fishing boat moves forward causes the pair of opposing swing out arms 20 having the net tubes 30 disposed thereon to convert from the stowed configuration "S" to the deployed configuration "D" as illustrated in FIG. 7. In addition, the upper nets 34 unfurl due to the buoyant force generated by flotation devices 36, and the and lower nets 38 unfurl due to the sinking force generated by weights 39. Once unfurled, nets 34 and 38 form wing-like structures. Drag causes the deployed fish landing net apparatus to travel down the fishing line until it reaches the end whereafter the increased drag forces cause the arms to move from the deployed position "D" to the capture position "C" where the top and bottom nets wrap around the fish thereby significantly diminishing its ability to thrash about so as to make it much easier to land the fish on a sport fishing vessel.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A fish landing net deployable into a body of water from a fishing boat by slidable connection to fishing line having an end, said fish landing net comprising:
   a guide rod having a distal end and a proximal end;
   a pair of arms pivotally connected by hinge mechanisms on opposing sides of said guide rod in proximity to the distal end thereof, said arms configurable between a folded position, a deployed position, and a capture position;
   said arms automatically moving from said folded position to said deployed position when placed in the body of water by hydrodynamic drag realized as the fishing boat moves forward through the body of water, said drag further causing the fish landing net to travel down the fishing line toward a hook;
   said arms automatically moving from said deployed position to said capture position upon reaching the end of the fishing line by increased drag realized as the fishing boat moves through the body of water;
   each of said arms having a net tube rotatably disposed thereon, each net tube including a tubular main body and upper and lower nets connected to said tubular main body, said upper and lower nets being configurable between a compact rolled configuration to an unrolled configuration;
   said upper net having at least one flotation device attached thereto; and
   said lower net having at least one weight attached thereto.

2. The fish landing net according to claim 1 wherein said upper and lower nets are formed of transparent material.

3. The fish landing net according to claim 1 wherein rotation of said net tubes functions to deploy said upper and lower nets.

* * * * *